United States Patent [19]

Murakoshi

[11] Patent Number: 4,580,180

[45] Date of Patent: Apr. 1, 1986

[54] METHOD OF AND APPARATUS FOR SCANNING TAPE WITH SCANNING HEAD

[75] Inventor: Makoto Murakoshi, Tokyo, Japan

[73] Assignee: Fuji Photo Film Co., Ltd., Ashigara, Japan

[21] Appl. No.: 446,627

[22] Filed: Dec. 3, 1982

[30] Foreign Application Priority Data

Dec. 10, 1981 [JP] Japan ............................. 56-199404

[51] Int. Cl.$^4$ .......................... G11B 5/08; G11B 15/60
[52] U.S. Cl. ................................. 360/84; 360/130.24
[58] Field of Search ............... 360/84, 85, 95, 130.23, 360/130.24

[56] References Cited

U.S. PATENT DOCUMENTS

| Re. 29,999 | 5/1979 | Hirota | 360/84 |
| 3,691,315 | 9/1972 | Ellmore | 360/84 |
| 4,348,706 | 9/1982 | Videc | 360/84 |

Primary Examiner—John H. Wolff
Attorney, Agent, or Firm—Birch, Stewart, Kolasch & Birch

[57] ABSTRACT

In a method and apparatus for scanning tape including a recording medium with a scanning head, the head runs along the circumference of a circle having a central axis inclined by a predetermined angle with respect to a reference direction. The tape is guided along the elliptical circumferential surface of an elliptical cylinder with the longitudinal direction of the tape substantially perpendicular to the reference direction and the width direction of the tape substantially parallel to the reference direction, the elliptical cylinder being formed by a generatrix which includes a point on the circumference of the circle and is substantially parallel to the reference direction, while the point moves along the circumference of the circle. The tape is scanned with the scanning head while the scanning head runs along a portion of the circumference of the circle, the portion of the circumference of the circle being associated with a sector of the circle which sector has a radius substantially perpendicular to the reference direction and extends to both sides of the radius each by a substantially equal angle about the central axis.

12 Claims, 7 Drawing Figures

METHOD OF AND APPARATUS FOR SCANNING TAPE WITH SCANNING HEAD

BACKGROUND OF THE INVENTION

1. Field of the Invention

The present invention relates to a method of and apparatus for scanning tape with a scanning head, and more particularly to such a method and apparatus for use in recording and/or playing back video signals on an elongated recording medium, such as magnetic tape.

2. Description of the Prior Art

Conventional video signal record and/or playback systems for recording and/or playing back video signals under raster scanning system, such as television signals, include the vertical track scanning system, such as the four-head video recording system provided by Ampex Corporation, the helical scanning system, and the arc track scanning system, for example. Home video cassette recorders, typically employ the helical scanning. The helical scanning system is advantageous in that track patterns are formed in straight on a tape with a certain video track angle maintained with respect to the longitudinal direction of the tape, giving rise to higher recording density per unit length of tape, variable recording density dependent upon the video track angle, and a closer and more uniform contact of a video head with the tape.

In the helical scanning system, however, a recording tape runs in contact with a rotary drum of magnetic heads with a certain angle maintained between the longitudinal direction of the tape and the circumferencial direction of the head drum. In order to accomplish a stable running of the tape on the magnetic head, however, precise and accurate adjustment may be required in the head assembly and tape driving mechanism.

With a video cassette system using a video tape cassette, a stable driving of tape requires the tape to be oriented or directed essentially both at the exit from the tape supply reel and at the entrance to the tape winding reel of the cassette in such a manner that the tape runs at a constant height and in parallel with respect to a reference plane, which is parallel to a main surface of the tape cassette, with the sidewise direction of the tape perpendicular to the reference plane. For that purpose, the so-called VHS system, for example, employs the so-called M-type loading, in which the tape guiding system essentially includes a magnetic head rotary drum inclined with respect to a tape by a predetermined angle, a pair of tape guide posts provided in slant near the periphery of the rotary drum and far from the imaginary line connecting the exit and the entrance, and a pair of vertical posts for maintaining a part of the tape in contact therewith by a predetermined angle. This is complicated in structure. In addition, in order to make a close contact with a portion of tape on a part of the circumferential surface of the rotary drum by means of the pair of guide posts inclined with respect to the reference plane, and to maintain the height of the tape with respect to the reference plane constant with a tolerance of submicrometers, extensive accuracy is required in manufacturing and mechanically adjusting the elements involved in the tape running mechanism.

In order to increase recording capacity per video cassette, it is also required to design video tape which is very thin, for example, less than twenty micrometers thick. Such thin video tape is so insufficient in strength of the base material used as to fail to oppose the forces raised in the longitudinal direction of the pair of guide posts. Therefore, an edge of the tape may sometimes ride the flanges of the posts. In the case of a video cassette recorder using a thinner tape material, mechanical accuracy should be much more increased in the tape running mechanism.

SUMMARY OF THE INVENTION

It is therefore an object of the present invention to provide a method of and apparatus for scanning tape with a ascanning head in which tape runs stably without the provision of complicated mechanism requiring accurate adjustment.

In accordance with the invention, a method of scanning tape including a recording medium with a scanning head comprises the steps of: running the head along the circumference of a circle having a central axis inclined by a predetermined angle with respect to a reference direction; guiding the tape along the elliptical circumferential surface of an elliptical cylinder with the longitudinal direction of the tape substantially perpendicular to the reference direction and the sidewise or width direction of the tape substantially parallel to the reference direction, said elliptical cylinder being formed by a generatrix which includes a point on the circumference of the circle and is substantially parallel to the reference direction, while the point moves along the circumference of the circle; and scanning the tape with the scanning head while the scanning head runs on a portion of the circumference of the circle, said portion of the circumference of the circle being associated with a sector of the circle which sector has a radius substantially perpendicular to the reference direction and extends to both sides of the radius each by a substantially equal angle about the central axis.

Also, in accordance with the invention, apparatus for scanning tape including a recording medium with a scanning head comprises: a rotary circular body having a central axis inclined by a predetermined angle with respect to a reference direction, and rotatable about the central axis; at least three scanning heads supported by the circular body along the circumference of the body with a substantially equal angular spacing provided therebetween and tape guide means for guiding the tape along the elliptical circumferential surface of an elliptical cylinder with the longitudinal direction of the tape substantially perpendicular to the reference direction and the sidewise or width direction of the tape substantially parallel to the reference direction, said elliptical cylinder being formed by a generatrix which has a point on the circumference of the circle and is substantially parallel to the reference direction, while the point moves along the circumference of the circle; said tape guide means being adapted to scan the tape with one of the scanning heads while the one of the scanning heads runs along a portion of the circumference of the circle, said portion of the circle being associated with a sector of the circle which sector has a radius substantially perpendicular to the reference direction and extends to both sides of the radius each by half an angle formed by adjacent two of the scanning heads with respect to the central axis.

The tape scanning system in accordance with the present invention will hereinafter be referred to as the "elliptical scanning system" in view of tape running along the circumferential surface of an elliptical cylinder.

As clear from the following description, the system in accordance with the invention is a sort of helical scanning system, in which track patterns on a tape form approximately a portion of a sinusoidal curve. It will be noted that the more magnetic heads arranged on a circular rotating body, or rotary disk, the more approximately linear portion, of a sinusoidal curve available. Of course, the azimuth recording is applicable to the elliptical scanning system, and the H alignment (horizontal scanning line alignment) is possible if only approximately linear portions of the sinusoidal curves are used as recording tracks.

BRIEF DESCRIPTION OF THE DRAWINGS

The objects and features of the invention will become more apparent from a consideration of the following detailed description taken in conjunction with the accompanying drawings in which.

DESCRIPTION OF THE PREFERRED EMBODIMENT

Figure 1:
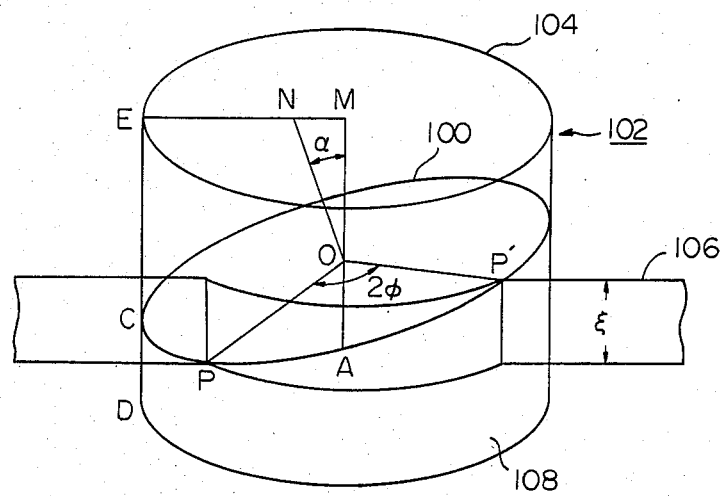
FIG 1 shows schematically the principle applicable to a tape scanning system in accordance with the present invention.

With reference to FIG. 1, the principle of the tape scanning system in accordance with the invention will be described. In the figure, a curve 100 depicts a circle having the center O. Circle 100 is inclined so that it has a normal ON at center O forming an angle α with respect to a segment of line OM, which is parallel in a reference direction, e.g. the direction from the top to the bottom of the figure.

While a point C on circle 100 is moving along circle 100, a segment of straight line DE including point C and extending in the reference direction, i.e. in parallel with the segment of line OM forms an elliptical cylinder 102. The segment of line DE is therefore a generatrix of elliptical cylinder 102. Although FIG. 1, which is a perspective view, depicts the FIG. 102 as if it were a circular cylinder, it is a elliptical cylinder having a central axis including the segment of line OM, a short axis of ellipse including a segment of line EM, and a long axis of ellipse including a segment of line OA. As shown in the figure, the segment of line ON having a point N on short axis EM is inclined to the left by an angle α, circle 100 thus inclining to the left by the same angle. In other words, circle 100 is inclined to the left by the angle α about the segment of line OA corresponding to the long axis of ellipse 104 with respect to a reference plane, e.g. a plane including ellipse 104. Ellipse 104 formed as a trace of point E has its long radius a and short radius b satisfying the following expressions:

$$a = OC = OA,$$

$$b = EM = OC \cdot \cos \alpha = a \cdot \cos \alpha \qquad (1)$$

In accordance with the present invention, along the circumference of circle 100 n scanning heads, for example, magnetic heads run with a substantially equal angular spacing about circle 100 with respect to each other. The spacing angle $2\phi(=\angle POP')$ between the adjacent heads are therefore $$2\phi = 2\pi/n \qquad (2)$$

An elongated recording medium 106, such as a magnetic tape, having an effective width w, which is available for recording video signals, for example, is in contact with a portion of the circumferential surface of elliptical cylinder 102, i.e. cylindrical surface 108 over the region including points P and P' on circle 100 so as to include at least angle $2\phi$ with respect to center O, as shown in the figure. In that case, tape 106 is so oriented or directed as to have its longitudinal direction parallel to a reference plane, e.g. a plane including ellipse 104, that is, parallel to the direction from left to right in the figure. In addition, tape 106 is in contact with a portion of cylindrical surface 108 so that the long axis of ellipse 104 including the segment of line OA divides equally the angle $2\phi = \angle POP'$ into two.

For example, in the case of a magnetic tape video signal recording system recording on a magnetic tape video signals formed in accordance with raster scanning, such as television signals, a plurality of horizontal scanning lines involved in one field may be recorded on a track PP' within the effective width w of magnetic tape 106. In the case of a recording head assembly having four magnetic heads arranged on circle 100, $2\phi = \pi/2$.

Figure 2:
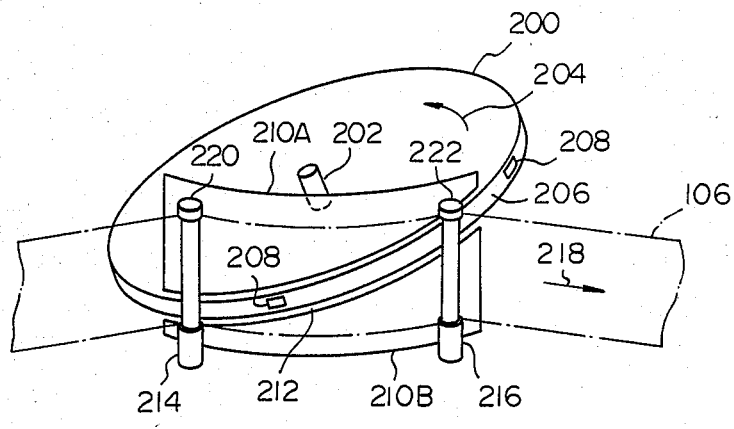
FIG. 2 is a perspective view schematically showing an embodiment of a tape scanning apparatus in accordance with the invention.

In FIG. 2, there is shown a rotary magnetic head assembly for a video tape recorder or video cassette recorder to which the invention is advantageously applicable. The illustrative embodiment includes a rotary disk 200 which is inclined by angle α with respect to a plane including ellipse 104 shown in FIG. 1. Disk 200 corresponds to circle 100 shown in FIG. 1, and is driven by a motor, not shown, by way of a rotary shaft 202 connected thereto, in the direction of arrow 204. Thus, rotary shaft 202 includes at its center the segment of line ON depicted in FIG. 1. The inclination angle α may advantageously be in the order of 5° through 6°, approximately. Disk 200 is a thin and low cylinder, as shown, having a circumferential or cylindrical surface 206 on which four magnetic heads 208 are disposed with the angular spacing between heads substantially equal to 90 degrees, for example.

In association with circumferential surface 206 of disk 200, tape guide members 210A and 210B are provided as shown in FIG. 2. Tape guides 210A and 210B are fixed on a base, not shown, which has a main surface parallel to the reference plane, for example. The base may, for example, be in parallel with a main surface of a tape cassette, not shown, which includes magnetic tape 106. Tape guides 210A and 210B have a curved surface as shown in the figure and are completely within elliptic cylindrical surface 108 of elliptic cylinder 102 to form a portion thereof. Between tape guide members 210A and 210B, a gap or spacing 212 is formed which has a substantially uniform width. From spacing 212, a portion of cylindrical surface 206 of disk 200 is exposed.

In FIG. 2, at the points corresponding to the points P' and P shown in FIG. 1, guide posts 214 and 216 are provided, respectively. Guide posts 214 and 216 are biased by appropriate springs, not shown, toward the center of disk 200 to be in contact with guide members 210A and 210B. Guide posts 214 and 216 may be separate from guide members 210A and 210B, namely, that is not in direct contact with guide members 210A and 210B. It is sufficient to arrange the central axis of the cylindrical surface formed by guide members 210A and 210B in parallel with the central axes of guide posts 214 and 216. Magnetic tape 106, depicted by a chain line, runs in the spacing between guide post 214 and guide members 210A and 210B over and in contact with the surface of guide members 210A and 210B to the spacing between guide post 216 and guide members 210A and 210B in the direction of arrow 218.

The height of tape 106, that is, the position of tape 106 in the direction from the top to the bottom of the figure is restricted by flanges 220 and 222 of guide posts 214 and 216, respectively.

While disk 200 rotates in the direction of arrow 204, magnetic head 208 records a track corresponding to a circular arc $\widehat{P'P}$ within the effective recording width w of tape 106. As magnetic tape 106 is driven by a tape driving mechanism, not shown, in the direction of arrow 218, a plurality of such tracks $\widehat{P'P}$ are subsequently formed on tape 106.

Figure 3A:
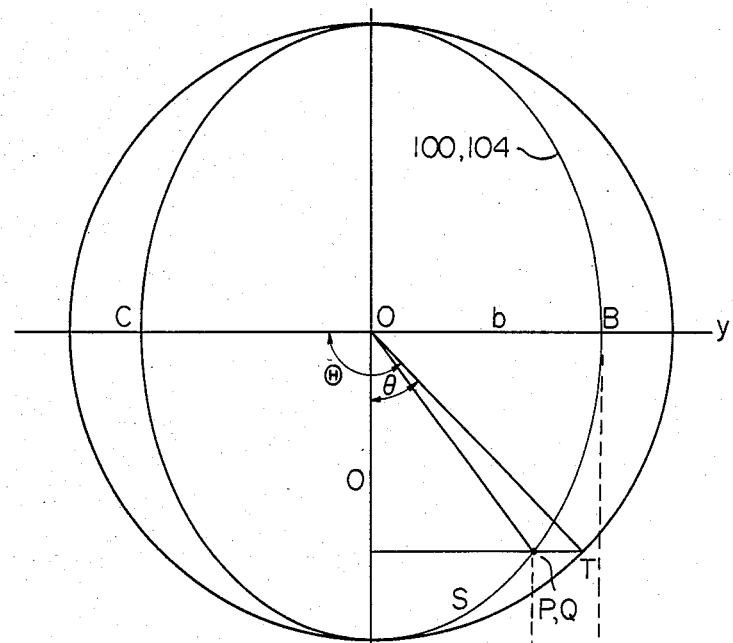
FIGS. 3A, 3B, 3C, 4 and 5 are views useful for understanding the detailed functions and operations of the scanning system in accordance with the invention.
Figure 3B:
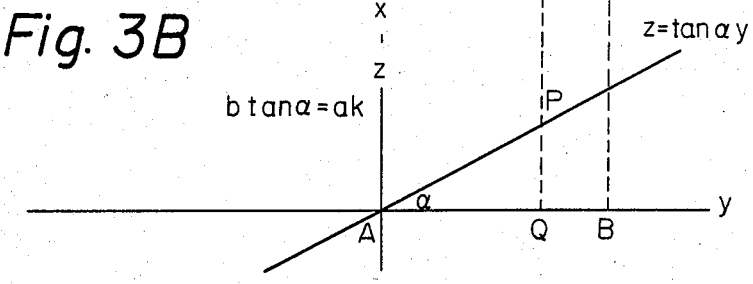
Figure 3C:
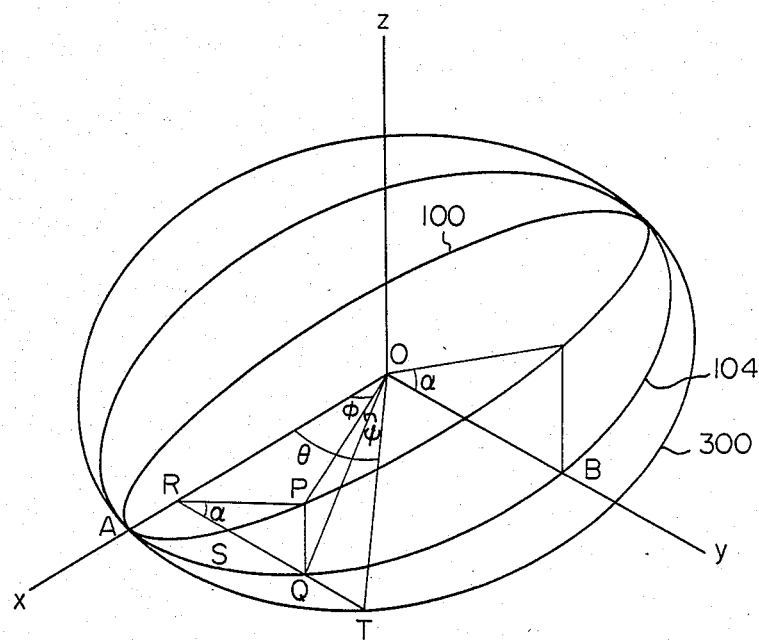

Now, a consideration will be made on track $\widehat{P'P}$ recorded on tape 106. In the x, y and z coordinates which has the original point corresponding to point O, shown in FIG. 1, an xy plane including the original point O and parallel to ellipse 104, and the z axis including the original point O and normal to the xy plane, i.e. parallel to the direction from the bottom to the top of FIG. 1, circle 100 and ellipse 104 are illustrated as in FIGS. 3A, 3B and 3C. In those figures, ellipse 104, which is a projection of circle 100 on the xy plane, crosses the x and y axes at points A and B, and a perpendicular line to the x axis from the point Q, which is a projection of point P on the circumference of circle 100 onto the xy plane, intersects the x axis at point R. A circle 300 having the same radius as of circle 100, i.e. the long axis a (=OA) of ellipse 104 crosses the extension of the segment of line RQ at a point T. Then, $\angle PRQ = \alpha$, $\angle POA = \phi$.

The eccentric angle $\theta$ is defined by the formula, $\angle TOA = \theta$, then ellipse 104 is defined by $x = a \cdot \cos \theta$, (2)

$y = b \cdot \sin \theta$, (3)

and the eccentricity thereof is defined by $k = \dfrac{\sqrt{a^2 - b^2}}{a} = \sin \alpha$. (4)

The height of point P, i.e. the length PQ is expressed by $z = y \tan \alpha$ (5)
$= ak \cdot \sin \theta$.

Thus, the height of point P traces a sinusoidal curve with respect to the eccentric angle $\theta$. Usually, if the angle $\alpha$ is very small (e.g. 5°) so as to make ellipse 104 ultimately close to a true circle, then track P'P formed on tape 106 is approximately sinusoidal.

If $\theta$ is small, namely, less than about $\pi/6$ (=30°), then it is approximated by a straight line, $y = ak\theta = a (\sin \alpha)\theta$.

In general, as discussed above, since $\alpha$ is very near to zero, for example, five degrees, it is approximated by a straight line, $y = a\alpha\theta$ In other words, a track formed in the region corresponding to $\theta$ of less than 30 degrees may be approximately a straight line. Accordingly, in order to utilize only that portion of the track, disk 200 may be designed to have six or more magnetic heads 208 provided with the spacing between the adjacent heads substantially equal to each other.

Figure 4:
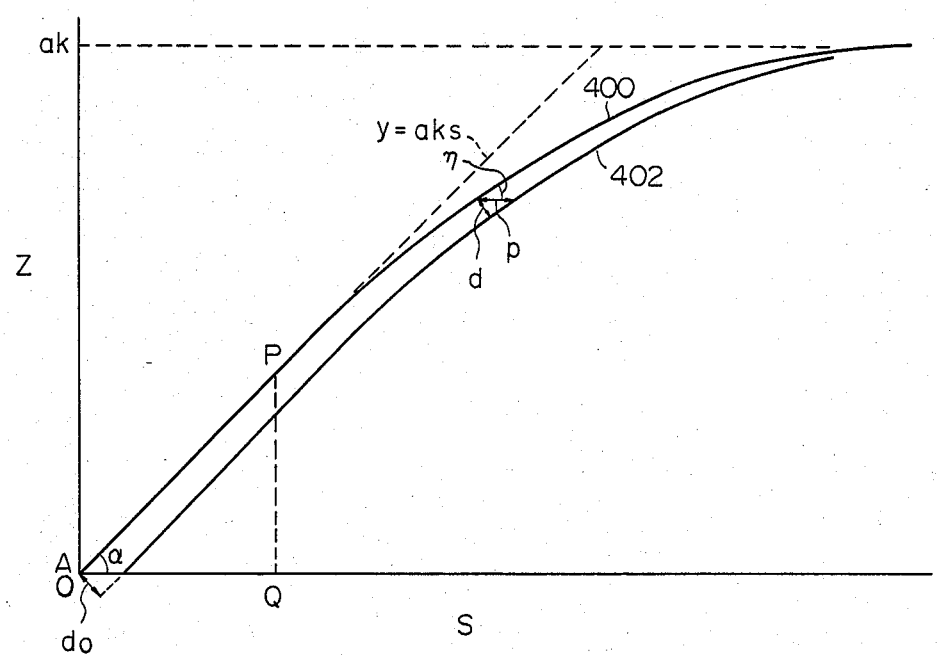

The track pattern formed on magnetic tape 106, that is, the pattern approximated by the above expression (5) plots the curve 400 as shown in FIG. 4. In FIG. 4, the abscissa shows the length of arc AQ=s of ellipse 104 and the ordinate shows the distance PQ=z as a function of s. In the figure, there is also shown the preceding track 402 recorded while tape is 106 running. The variable s is defined by $$s = a \int_0^\theta \sqrt{1 - k^2 \cos^2\theta}\, d\theta.$$

This integration is determined in terms of elliptical integration. If $\alpha$ is small, then the ellipse comes near a circle so that $s = a\theta$, the track pattern on tape 106 being approximate to a sinusoidal curve, as discussed above.

On magnetic tape 106, the distance or pitch in the angular ($\theta$) direction between tracks 400 and 402 is designated by p, and the distance between adjacent tracks in the direction of width of a track, namely, in the direction perpendicular to the moving direction of magnetic head 208 with respect to magnetic tape 106 (the tangential direction of the track patterns) is depicted by d. The overlapping ratio $\xi$ of adjacent tracks is defined by $\xi = \dfrac{d_o - d}{d}$, (6)

where $d_o$ is the distance between the adjacent tracks when s=0. Taking account of an angle $\eta$ of the tangent of a track formed with respect to the direction of pitch p, the following formula is approximately established, $d = p \sin \eta$, and since at point A, $\eta = \alpha$, the overlapping ratio $\xi$ at an appropriate point on a track is $\xi = \dfrac{d_o - d}{d_o} = \dfrac{p \sin\alpha - p \sin\eta}{p \sin}$ (7)

$= \dfrac{p \sin\alpha - p \sin\alpha \cos\theta}{p \sin\alpha}$ $= 1 - \cos \theta$, where $0 \leq \theta \leq \pi/2$, and $0 \leq \eta < \alpha < \pi/2$.

From expression (7), it will be appreciated that when $\theta = \pi/2$, $\xi = 1$, so that the adjacent tracks are completely overlapped, a rotary disk having two magnetic heads would be impractical. Accordingly, in order to make $\xi$ less than unity, it is necessary to provide three or more magnetic heads on a rotary disk. Taking account of azimuth recording technique, it is more preferable to design a rotary disk having four or more even number of magnetic heads. For example, designing disk 200 with four magnetic heads and using tracks within the region formed by the angle $\theta = \pi/4$, $\xi = 0.29$, which means that approximately thirty percent of the adjacent tracks are overlapped with each other at the end portions of the tracks, $\theta = 45°$. Consequently, in order to make tracks almost straight and less overlapping between the adjacent tracks, it is preferable to design a rotary disk having a greater number of magnetic heads. It is to be noted that the overlapping ratio represented by the expression (7) is the same as that of the so-called circular arc track scanning system.

Figure 5:
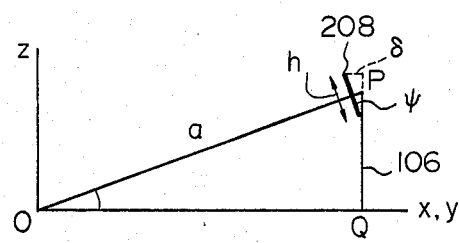

Now, considering a tilt, which is a contact angle formed by a contact or head surface of magnetic head 208 with respect to magnetic tape 106, as clear from FIG. 2, side or circumferential surface 206 of disk 200 is always in parallel contact with the recording surface of tape 106 because driving shaft 202 is inclined by angle $\alpha$ with respect to the reference direction, i.e. the z axis. Namely, the entire contact surface of magnetic head 208 is not always in contact with tape 106. In FIG. 5, the head surface or contact surface of magnetic head 208 is illustrated in slant by a contact angle $\psi$ with respect to the surface PQ of magnetic tape 106. Then, $$\angle POQ = \psi,$$

where $\psi$ changes from $\psi = 0$ at $\theta = 0$ through $\psi = \alpha$ at $\theta = \pi/2$.

From FIG. 5, it will be appreciated that $$PQ = z = a \sin \psi,$$

and combining this with expressions (4) and (5), $$\sin \psi = \sin \alpha \sin \theta. \tag{8}$$

In general, $\alpha$ and $\psi$ take a value close to zero, the expression (8) is approximated by $$\psi \approx \alpha \sin \theta. \tag{9}$$

It is clear therefrom that in order to decrease tilt angle $\psi$, disk 200 is preferably designed so as to have a small inclination $\alpha$ and a relatively large number of magnetic heads, namely, it is preferable to minimize the angle $\theta$ within which head 208 is in contact with tape 106.

According to expression (9), if disk 200 has four heads, i.e. $\theta = \pi/4$ (45°) with $\alpha = 5°$, for example, then $\psi = 3.5$. This means that in the case of disk 200 having four magnetic heads 208 with equal angular spacing between the adjacent heads, the maximum contact angle $\psi$ is 3.5°, namely, the contact angle $\psi$ takes the values between 0° through 3.5°. If the height h, FIG. 5, of the contact surface of head 208 is 20 micrometers, for example, then the "distance" $\delta$, FIG. 5, of the contact surface or head surface of head 208 from the surface PQ of the tape 106 is $$\delta = h \sin \psi$$

$$= 20 \sin 3.5° = 1.2 \ \mu m.$$

Such an amount of the distance may advantageously be compensated for by the flexibility of pliability of tape 106, as well as by designing the contact surface of head 208, which surface is curved with respect to the direction parallel to the direction of the generatrix of the cylinder containing the circumferential surface of disk 200, i.e. the direction of driving shaft 202, or which surface is variable in its direction in response to the relative orientation of the recording surface of tape 106 to head 208.

The tape scanning system in accordance with the present invention will thus facilitate a recording tape to run or be guided on the level with respect to the running direction thereof, resulting in improving the stability of tape running. This does not require such critical mechanical accuracy of the tape guiding mechanism and the head assembly of the tape scanning system as required in the conventional helical scanning system. Particularly, in the case of a video tape cassette recorder, the tape running on a level with respect to the main or reference surface of a tape cassette used removes undesired forces applied thereto except for the direction in which the tape runs to be guided in its natural position. A portion of the tape extracted from a tape cassette, when loaded in a deck, is shorter than that of a conventional M loading or U loading system. It is possible to design a video tape cassette from which a portion of tape is not taken out of the cassette, when loaded in a deck, as in the case of an audio tape recorder.

The above description is directed to magnetic recording of video signals formed in accordance with the raster scanning system. However, the invention is not restricted thereto. For example, alternatively to the magnetic heads, optical recording may be applied thereto which employs a laser head and/or an optical head including a light emitting diode and a photosensitive device. The invention is also applicable to recording and/or playing back signals in a digital form, such as data signals, including signals transmitted via a telecommunication satellite, for example.

While the present invention has been described in terms of a specific illustrative embodiment, it is to be appreciated to be susceptible of modification by those skilled in the art within the spirit and scope of the appended claims.

What I claim is:

1. A method of scanning tape including a recording medium with a scanning head comprising the steps of:
running the head along the circumference of a circle having a central axis inclined by a predetermined angle with respect to a reference direction;
guiding the tape along the elliptical circumferential surface of an elliptical cylinder with the longitudinal direction of the tape substantially perpendicular to the reference direction and the width direction of the tape substantially parallel to the reference direction, said elliptical cylinder being formed by a generatrix which includes a point on the circumference of the circle and is substantially parallel to the reference direction, while the point moves along the circumference of the circle, whereby the tape is guided to run in the direction substantially perpendicular to the generatrix; and scanning the tape with the scanning head while the scanning head runs on a portion of the circumference of the circle, said portion of the circumference of the circle being associated with a sector of the circle which sector has a radius substantially perpendicular to the reference direction and extends to both sides of the radius each by a substantially equal angle about the central axis.

2. A method in accordance with claim 1, wherein said head running, tape guiding and tape scanning steps are performed simultaneously.

3. A method in accordance with claim 1, wherein said scanning head comprises a magnetic head, said recording medium comprising a magnetic recording substance suitable for recording video signals formed by a raster scanning.

4. Apparatus for scanning tape including a recording medium with a scanning head comprising:

a rotary circular body having a central axis inclined by a predetermined angle with respect to a reference direction, and rotatable about the central axis;

at least three scanning heads supported by the circular body along the circumference of the body with a substantially equal angular spacing provided between the scanning heads; and tape guide means for guiding the tape along the elliptical circumferential surface of an elliptical cylinder with the longitudinal direction of the tape substantially perpendicular to the reference direction and the width direction of the tape substantially parallel to the reference direction, said elliptical cylinder being formed by a generatrix which has a point on the circumference of the circle and is substantially parallel to the reference direction, while the point moves along the circumference of the circle, whereby the tape is guided to run in the direction substantially perpendicular to the generatrix;

said tape guide means being adapted to scan the tape with one of the scanning heads while the one of the scanning heads runs along a portion of the circumference of the circle, said portion of the circle being associated with a sector of the circle which sector has a radius substantially perpendicular to the reference direction and extends to both sides of the radius each by half an angle formed by adjacent two of the scanning heads with respect to the central axis.

5. Apparatus in accordance with claim 4, wherein said tape guide means comprises a tape guide member forming a portion of the elliptical circumferential surface of the elliptical cylinder, and guide post means for maintaining a portion of the tape in contact with the tape guide member along the circumferential portion of the sector.

6. Apparatus in accordance with claim 4, wherein said scanning heads comprise magnetic heads, said recording medium comprising a magnetic recording substance suitable for recording video signals formed by a raster scanning.

7. Apparatus in accordance with claim 4, wherein an even plurality of scanning heads are supported by said circular body.

8. Apparatus in accordance with claim 7, wherein four scanning heads are supported by said circular body.

9. Apparatus in accordance with claim 8, wherein said predetermined angle is within a range approximately from 5 degrees to 6 degrees, inclusive.

10. Apparatus for scanning magnetic recording tape with a magnetic video head comprising:

a rotary circular body having a central axis inclined by a predetermined angle with respect to a reference direction, and rotatable about the central axis;

four magnetic video heads supported by the circular body along the circumference of the body with a substantially equal angular spacing provided between the scanning heads; and tape guide means for guiding the tape along the elliptical circumferential surface of an elliptical cylinder with the longitudinal direction of the tape substantially perpendicular to the reference direction and the width direction of the tape substantially parallel to the reference direction, said elliptical cylinder being formed by a generatrix which includes a point on the circumference of the circle and is substantially parallel to the reference direction, while the point moves along the circumference of the circle, whereby the tape is guided to run in the direction substantially perpendicular to the genratrix;

said tape guide means being adapted to scan the tape with one of the video heads while the one of the video heads runs along a portion of the circumference of the circle, said portion of the circle being associated with a sector of the circle which sector has radius substantially perpendicular to the reference direction and extends to both sides of the radius each by half an angle formed by adjacent two of the video heads with respect to the central axis.

11. Apparatus in accordance with claim 10, wherein said tape guide means comprises a pair of tape guide members forming a portion of the elliptical circumferential surface of the elliptical cylinder and extending both sides of the circular body, and a pair of guide posts, each provided substantially in parallel to the reference direction and near one of the ends of the circumferential portion of the sector for maintaining a portion of the tape in contact with the tape guide members along the circumferential portion of the sector.

12. Apparatus in accordance with claim 10, wherein said predetermined angle is within a range approximately from 5 degrees to 6 degrees, inclusive.

* * * * *